Patented Feb. 4, 1930

1,745,893

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

PRIMER CONTAINING SYNTHETIC PRODUCTS

No Drawing.   Application filed September 26, 1924. Serial No. 740,141.

This invention relates to the production of compositions suitable for use as a primer coating and relates particularly to the production of a primer coating suitable for use with nitrocellulose paints, enamels and lacquers.

Heretofore it has been the practice to utilize as primers for wood or metallic surfaces, paint compositions consisting of a pigment and vehicle, the pigment consisting largely of silica or similar hard filler and the vehicle consisting of linseed and other drying oils either with or without the addition of natural resins and volatile solvents. This type of priming composition has been used on surfaces where oil paints and varnishes are to be subsequently applied, in order to provide smooth and even surfaces. Priming compositions of this type have been used not only for oil painted or varnished surfaces but also where nitrocellulose lacquers and lacquer enamels are to be applied. They have been more or less unsatisfactory for use under nitrocellulose coatings due to the action of the thinners used in the preparation of nitrocellulose compositions. These thinners are strong solvents and act as paint and varnish removers. The oil primer coatings also require a long drying period as otherwise they cannot be used under other coatings due to the action of the solvents.

By the employment of synthetic resins a new and improved type of priming composition can be made which adheres well to both wood and metallic surfaces, is flexible and yet hard and tough, dries quickly and is not readily softened or affected by subsequent application of oil paints and varnishes or nitrocellulose lacquers, paints or enamels. This is a distinct improvement over the usual type of priming composition.

While nitrocellulose priming compositions have heretofore been made and used they have not been satisfactory because this type of primer lacked proper adhesion and also did not fill in the pores or hollow places in the surface of the object to be primed. This is characteristic of nitrocellulose compositions and it is well known that these compositions show all of the irregularities of surface coated while ordinary oil primers fill the pores and smooth out all such irregularities.

By the present invention improved nitrocellulose priming compositions can be made which have great adhesion for both wood and metallic surfaces, dry quickly and which yield very smooth surfaces, filling in all pores and depressions fully as well as the usual oil primer. Thus, the improved nitrocellulose primer may be used either for nitrocellulose lacquers and enamels or for ordinary paints and varnishes and are not marred by application of these materials as are the oil primers.

The use of synthetic resins in suitable proportions in the preparation of nitrocellulose priming compositions produces the much desired results and by such use I have produced the new and improved nitrocellulose priming compositions. I have found that if the quantity of resin used be sufficiently in excess of the amount of nitrocellulose the coatings made therefrom will have improved adhesion and flow and will fill in all pores and irregularities fully as well as the oil primers. Natural resins also may be used where their objectionable features can be overcome. In general when I utilize a natural resin I find it advantageous to incorporate it with a suitable synthetic resin. In some cases it is of advantage to use softeners such as castor oil, diethylphthalate, benzoic glyceride, triphenyl or tricresyl phosphates, camphor and the like. The addition of compounds of this nature are within the scope of my invention.

Among the synthetic resins which are suitable are the glycerol polybasic acid resins and the glycerol mixed acid resins and in particular I refer to the following, rosin phthalic glyceride, congo phthalic glyceride, rosin congo phthalic glyceride, benzoic phthalic glyceride, salicylic phthalic glyceride and phthalic glyceride. These resins are made from glycerol and the corresponding acids or in place of glycerol I may utilize polyglycerol, glycols or chlorhydrins although in general I utilize glycerol. In some cases a natural resin such as dammar and rosin ester may be utilized.

Various pigments and fillers may be used according to color, hardness and other properties desired. As in oil primers it is usually best to have a pigment portion rather high in silica or other similarly hard filler. The silica or other agent or pigment employed to assist in giving a filling effect in the priming coating is referred to hereinafter as an extending agent.

Various softeners may be used but must be selected according to the resin utilized, for example with rosin phthalic glyceride resin a castor oil softener may be used successfully but this softener cannot be used with phthalic glyceride and another softener such as diethylphthalate must be used instead. The usual nitrocellulose solvents are employed and are adjusted to give quick drying and to produce a non-blushing film.

One particular priming composition which has given good results is made as follows:—

15 parts (by weight) rosin phthalic glyceride resin.
2 parts castor oil.
5 parts nitrocellulose.
2 parts zinc oxide.
½ part silex.
20 parts butyl acetate.
30 parts ethyl acetate.
50 parts benzol.

The composition is ground in a ball mill for at least 10 hours. The proportion of resin to nitrocellulose may be varied if desired but should not be less than two parts of resin to one of nitrocellulose. In the above formula three parts by weight of the rosin phthalic glyceride are used to one part of nitrocellulose and good results may be obtained by using a ratio of one part of nitrocellulose to four of the resin, or even a higher proportion of the latter. Generally speaking at least three parts of resin to one part of nitrocellulose is desirable.

Other glycerol polybasic or mixed acid resins may be used in place of the rosin phthalic glyceride if desired and in some cases a percentage of natural resin may also be incorporated. Other softeners may be used and solvents modified or changed where deemed of advantage.

This application is a continuation of a series of applications for patents which I have filed in the past relating to nitrocellulose and synthetic resins compatible therewith employed in coating compositions. The present invention in its broader aspects involves the employment of such coating compositions for priming purposes including the process of priming a surface of wood, steel or other metal with such compositions to form an adherent coating on which the requisite protective or decorative finish may be built up. In the more specific aspects of the present invention the employment of compositions containing a relatively high proportion of synthetic resin with respect to nitrocellulose is involved. The use of such high proportions for example three or four parts or more of resin to one part of nitrocellulose affords a product of utility for priming purposes which might not be advantageous if used in other ways. The nitrocellulose employed may be of any appropriate type such as ordinary soluble cotton, celluloid pyroxylin, gun cotton, gelatinized cotton, celluloid and waste celluloid scrap or film. The synthetic resin must be one which will blend satisfactorily and be entirely compatible with the nitrocellulose when employed in such proportions. There are various resins which when employed in relatively small amounts will mix with nitrocellulose but as soon as any large proportion of the resin is employed very brittle and unsatisfactory coatings result. The high degree of compatibility with nitrocellulose possessed by the glycerol organic acid type of resins and especially those containing two or more organic acids combined with the glycerol render these especially applicable to the purposes of the present invention and constitute a preferred embodiment.

A still more specific feature is that of employing a complex resin from glycerol and two or more organic acids, one of which is a dibasic acid such as phthalic acid or anhydride and the other is a monobasic acid such as benzoic or salicylic acid. These complex products have a very desirable blending action and possess physical properties in other ways highly appropriate.

What I claim is:—

1. An article of manufacture carrying a plurality of coatings including a primer coating and a nitrocellulose coating superposed upon said primer coating, said primer coating comprising a synthetic resin including a benzoic phthalic glyceride.

2. An article of manufacture carrying a plurality of coating layers including a primer coating and a nitrocellulose coating superposed upon said primer coating, said primer coating comprising a synthetic resin of the polybasic acid-polyhydric alcohol type.

3. An article of manufacture carrying a plurality of coating layers including a primer coating and a nitrocellulose coating superposed upon said primer coating, said primer coating comprising a synthetic resin of the polybasic acid-glycerol type.

4. An article of manufacture carrying a plurality of coating layers including a primer coating and a nitrocellulose coating superposed upon said primer coating, said primer coating comprising a synthetic resin of the phthalic glyceride type.

5. An article of manufacture carrying a plurality of coating layers including a primer coating and a nitrocellulose coating superposed upon said primer coating, said primer coating comprising a synthetic resin of the phthalic glyceride type and rosin ester.

6. An article of manufacture carrying a plurality of coating layers including a primer coating and a nitrocellulose coating superposed upon said primer coating, said primer coating comprising nitrocellulose and a phthalic glyceride resin.

7. An article of manufacture carrying a plurality of coating layers including a primer coating and a nitrocellulose coating superposed upon said primer coating, said primer coating comprising nitrocellulose and a polybasic acid-polyhydric alcohol resin.

8. An article of manufacture carrying a plurality of coating layers including a primer coating and a nitrocellulose coating superposed upon said primer coating, said primer coating comprising nitrocellulose and a much larger proportion of a polybasic acid-polyhydric alcohol resin.

9. An article of manufacture carrying a plurality of coating layers including a primer coating and a nitrocellulose coating superposed upon said primer coating, said primer coating comprising nitrocellulose with at least three times its weight of a polybasic acid-polyhydric alcohol resin.

10. An article of manufacture carrying a plurality of coating layers, one of which is a primer coating comprising a synthetic resin of the polybasic acid-polyhydric alcohol type.

11. An article of manufacture carrying a plurality of coating layers, one of which is a primer coating comprising a synthetic resin produced from a polybasic acid, a monobasic acid and a polyhydric alcohol.

CARLETON ELLIS.